(No Model.)

R. G. HANFORD, Jr.
MATERIAL FOR MAKING MOLDS.

No. 354,316. Patented Dec. 14, 1886.

Witnesses
Jas. R. Bowen.
Chas. J. Mordy.

Inventor
Robert G. Hanford Jr.
by his attorneys
Gifford & Brown

UNITED STATES PATENT OFFICE.

ROBERT G. HANFORD, JR., OF COLUMBUS, OHIO.

MATERIAL FOR MAKING MOLDS.

SPECIFICATION forming part of Letters Patent No. 354,316, dated December 14, 1886.

Application filed May 14, 1886. Serial No. 202,194. (No model.)

*To all whom it may concern:*

Be it known that I, ROBERT G. HANFORD, Jr., of Columbus, in the county of Franklin and State of Ohio, have invented a certain new and useful Improvement in Molds, of which the following is a specification.

My improvement relates to molds for casting metal.

Much difficulty has been experienced heretofore in obtaining a porous mold which might be used a number of times without injury.

It is the object of my improvement to provide such a mold.

I will describe in detail a mold embodying my improvement, and then point out the novel features in a claim.

Figure 1:
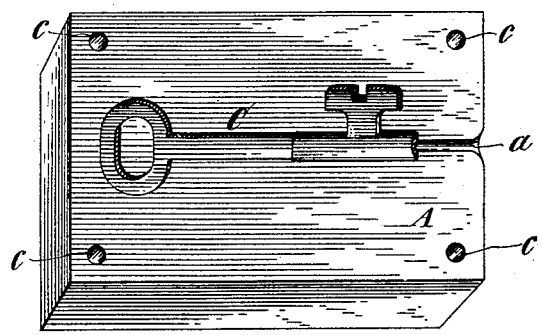
Figure 2:
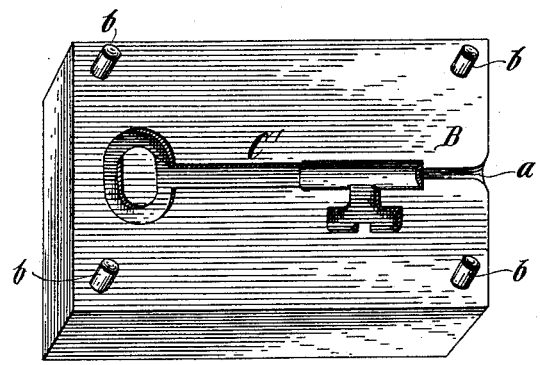

In the accompanying drawings, Figure 1 is a perspective view of one half of a mold embodying my improvement. Fig. 2 is a perspective view of the other half of the mold.

Similar letters of reference designate corresponding parts in both figures.

A B designate two parts of a mold. As shown, they are each of rectangular form; but they may be of any desired shape. I form in each of the portions A B such portion of a matrix that when the parts are placed together they will form a close mold, into which metal may be poured. I have only shown one such matrix, but I may of course use any desired number.

The matrix I have shown is in the form of a key, C C', into which molten metal may be poured through an ingate, *a*, when the parts are together. The parts are rigid and hard and may be provided with guide-pins *b* and slots or holes *c* for receiving the pins.

I construct the parts A B of a highly-porous refractory material. I have found the following to be a very suitable material—namely, a mixture of graphite, clay, and sand. The proportion of each of these ingredients used may be varied as circumstances require, but I have found the following to be satisfactory: For a mixture of, say, one hundred pounds, I use about forty pounds of graphite, forty-eight pounds of clay, about twenty-one pounds of which shall be air-dried clay and the balance calcined clay, and twelve pounds of sand. These may be mixed together in any suitable manner, preferably with sufficient liquid to form a paste. After the mixture has been prepared I run it or force it into suitable molds, which give it suitable shape for the parts A B, and form therein the desired matrices, ingates, &c. The parts are then removed from the mold or molds and baked or allowed to solidify. When thoroughly hardened, they are ready for use.

My improved mold is very strong, is refractory enough to stand the heat of repeated castings, and porous enough to allow of the escape of gases. It is cheap and will conduce to a very great saving in the cost of molding and the labor necessary to the old methods.

What I claim as my invention, and desire to secure by Letters Patent, is—

A mold composed of a mixture of graphite, air-dried clay, fire-clay, and sand, substantially as specified.

ROBERT G. HANFORD, JR.

Witnesses:
 JAMES D. GRISWOLD,
 JAS. R. BOWEN.